US008274936B2

(12) United States Patent
Yoo (10) Patent No.: US 8,274,936 B2
(45) Date of Patent: Sep. 25, 2012

(54) APPARATUS AND METHOD FOR UPLINK TRANSMISSION IN WIRELESS COMMUNICATION SYSTEM

(75) Inventor: Hee Chul Yoo, Anyang-si (KR)

(73) Assignee: LG Electronics Inc., Seoul (KR)

( * ) Notice: Subject to any disclaimer, the term of this patent is extended or adjusted under 35 U.S.C. 154(b) by 456 days.

(21) Appl. No.: 12/435,674

(22) Filed: May 5, 2009

(65) Prior Publication Data

US 2009/0279495 A1 Nov. 12, 2009

Related U.S. Application Data

(60) Provisional application No. 61/050,987, filed on May 6, 2008.

(30) Foreign Application Priority Data

Jul. 10, 2008 (KR) ...................... 10-2008-00066853

(51) Int. Cl.
*H04W 4/00* (2009.01)
(52) U.S. Cl. .................................... 370/329; 455/552.1
(58) Field of Classification Search .................. 370/329, 370/311, 350
See application file for complete search history.

(56) References Cited

U.S. PATENT DOCUMENTS

| 6,421,334 | B1 | 7/2002 | Baines | |
|---|---|---|---|---|
| 7,092,727 | B1* | 8/2006 | Li et al. | 455/466 |
| 7,742,739 | B2* | 6/2010 | Diaz Cervera et al. | 455/11.1 |
| 2002/0041567 | A1* | 4/2002 | Yi et al. | 370/236 |
| 2002/0187789 | A1* | 12/2002 | Diachina et al. | 455/452 |
| 2003/0007459 | A1* | 1/2003 | Yi et al. | 370/252 |
| 2004/0038691 | A1* | 2/2004 | Shin | 455/466 |
| 2004/0208142 | A1 | 10/2004 | Saw | |
| 2005/0054365 | A1 | 3/2005 | Ahn et al. | |
| 2005/0147040 | A1* | 7/2005 | Vayanos et al. | 370/235 |
| 2005/0193309 | A1* | 9/2005 | Grilli et al. | 714/752 |
| 2008/0188224 | A1* | 8/2008 | Pani et al. | 455/436 |
| 2008/0225783 | A1* | 9/2008 | Wang et al. | 370/329 |
| 2008/0233941 | A1* | 9/2008 | Jen | 455/418 |
| 2008/0310396 | A1* | 12/2008 | Park et al. | 370/350 |
| 2009/0161654 | A1* | 6/2009 | Cai et al. | 370/350 |

(Continued)

FOREIGN PATENT DOCUMENTS

WO WO-2004/102833 A1 11/2004

(Continued)

OTHER PUBLICATIONS

"Analysis of GERAN RR functionality", Oct. 13, 2000, Nokia, 3GPP TSG GERAN, pp. 1-21.*

*Primary Examiner* — Bunjob Jaroenchonwanit
(74) *Attorney, Agent, or Firm* — Birch, Stewart, Kolasch & Birch, LLP (57) ABSTRACT

An apparatus and method for uplink transmission in a wireless communication system are provided. The method comprises detecting an expiry of a time alignment timer in a MAC (Medium Access Control) layer, the time alignment timer being used to control how long the UE is considered uplink time aligned, notifying a release of PUCCH (Physical Uplink Control Channel) resources from the MAC layer to a RRC (Radio Resource Control) layer when the expiry of the time alignment timer is detected and keeping a part of the PUCCH (Physical Uplink Control Channel) resources in the RRC layer.

15 Claims, 8 Drawing Sheets

U.S. PATENT DOCUMENTS

| | | | |
|---|---|---|---|
| 2009/0196208 A1* | 8/2009 | Yu et al. | 370/311 |
| 2009/0197589 A1* | 8/2009 | Kitazoe | 455/422.1 |
| 2009/0201880 A1* | 8/2009 | Aghili et al. | 370/331 |
| 2009/0232067 A1* | 9/2009 | Pajukoski et al. | 370/329 |
| 2009/0232107 A1* | 9/2009 | Park et al. | 370/336 |
| 2009/0247176 A1* | 10/2009 | Song et al. | 455/450 |
| 2009/0252182 A1* | 10/2009 | Maheshwari et al. | 370/474 |
| 2009/0259910 A1* | 10/2009 | Lee et al. | 714/748 |
| 2010/0279695 A1* | 11/2010 | Amirijoo et al. | 455/438 |
| 2011/0158188 A1* | 6/2011 | Womack et al. | 370/329 |

FOREIGN PATENT DOCUMENTS

WO    WO 2009084998 A1 *   7/2009

* cited by examiner

APPARATUS AND METHOD FOR UPLINK TRANSMISSION IN WIRELESS COMMUNICATION SYSTEM

CROSS-REFERENCE TO RELATED APPLICATIONS

This application claims the benefit of priority of U.S. Provisional Application No. 61/050,987 filed on May 6, 2008, and Korean Patent Application No. 10-2008-0066853 filed on Jul. 10, 2008, which are incorporated by reference in their entirety herein.

BACKGROUND

1. Technical Field

The present invention relates to wireless communication and, more particularly, to an apparatus and method for uplink transmission in a wireless communication system.

2. Related Art

A 3GPP ($3^{rd}$ Generation Partnership Project) based on a WCDMA (Wideband Code Division Multiple Access) radio access technique is being extensively developed all over the world. An HSDPA (High Speed Downlink Packet Access), which may be defined as a first evolution of the WCDMA, provides a radio access technique with a highly competitive edge in the mid-term future to the 3GPP. However, as requirements and expectations of users and service providers are continuously increasing and development of competing wireless access techniques is ongoing, a new technical evolution from the 3GPP is requested to ensure competitiveness in the future. The requirements include a reduction in costs per bit, an increase in service availability, the flexible use of frequency bands, a simple structure and an open interface, proper power consumption of terminals (i.e., user equipments (UEs)), and the like.

One of systems considered in the next generation is an OFDM (Orthogonal Frequency Division Multiplexing) system that can attenuate an inter-symbol interference effect with a low complexity. In the OFDM, serially inputted data symbols are converted into N number of parallel data symbols, which are then included in N number of separated subcarriers, so as to be transmitted. The subcarriers maintain orthogonality in a frequency domain. The respective orthogonal channels experience mutually independent frequency selective fading, and the intervals of transmitted symbols are lengthened to minimize the inter-symbol interference.

In the OFDM-based wireless communication system, it is important to match time synchronization between a UE and a base station (BS) to minimize interference among users. A random access procedure is performed for uplink synchronization between the UE and the BS. During the random access procedure, the UE matches time synchronization based on a time alignment value transmitted from the BS. When the uplink synchronization is made, the UE runs a time alignment timer. While the time alignment timer is running, the UE and the BS are considered to be in the uplink synchronization. If the time alignment timer expires or does not run, the UE and the BS are not in synchronization, so uplink transmission, except for a random access preamble transmission, is not made.

In general, when the uplink synchronization has not been made because the time alignment timer expires or does not run, the UE releases control resource and obtains time synchronization, and then reconfigures control resource for uplink transmission.

In this case, however, if the uplink synchronization has not been made, uplink data could be transmitted only if the uplink synchronization is made. That is, releasing the control resource and reconfiguring it again is ineffective and causes a time delay.

Thus, a method for effective uplink transmission even when the time alignment timer expires or does not run is required.

SUMMARY

The present invention provides an apparatus and method for uplink transmission by a UE.

According to an embodiment of the present invention, there is provided a method for uplink transmission in a wireless communication system, carried by an user equipment, the method comprises detecting an expiry of a time alignment timer in a MAC (Medium Access Control) layer, the time alignment timer being used to control how long the UE is considered uplink time aligned, notifying a release of PUCCH (Physical Uplink Control Channel) resources from the MAC layer to a RRC (Radio Resource Control) layer when the expiry of the time alignment timer is detected and keeping a part of the PUCCH (Physical Uplink Control Channel) resources in the RRC layer.

The method may further comprise performing a random access for restarting the time alignment timer.

The method may further comprise resuming the part of PUCCH resource after the time alignment timer is restarted.

The part of PUCCH resources may be one for transmitting a ACK/NACK (Acknowledgement/Negative-acknowledgement) signal after the time alignment timer is restarted.

According to another embodiment of the present invention, there is provided a method for uplink transmission in a wireless communication system, carried by an user equipment, the method comprises starting a time alignment timer which is used to control how long the user equipment is considered uplink time aligned, keeping a part of PUCCH resources when the time alignment timer is expired, performing a random access between the user equipment and a base station for restarting the time alignment timer and receiving a message which is used to determine a contention resolution for the random access from the base station.

The method may further comprise transmitting an ACK/NACK signal for the message, wherein the ACK/NACK signal is transmitted via the part of PUCCH resources.

Performing the random access may comprise transmitting a random access preamble to the base station after the time alignment timer is expired and restarting the time alignment timer upon receipt of a random access response for the random access preamble, wherein the random access response comprises a timing advance to be applied for restarting the time alignment timer.

The random access response may further comprise an uplink grant, a random access preamble identifier corresponding to the transmitted random access preamble and a temporary C-RNTI (Cell-Radio Network Temporary Identity).

Performing the random access may further comprise transmitting a scheduled message indicated by the temporary C-RNTI via the uplink grant to the base station.

The part of the PUCCH resource may be released if the user equipment does not receive the random access response including the time alignment value within a certain time.

According to the embodiment of the present invention, when a time alignment timer expires or does not run, uplink time synchronization (uplink time alignment) is quickly made for uplink transmission.

DESCRIPTION OF EXEMPLARY EMBODIMENTS

Figure 1:
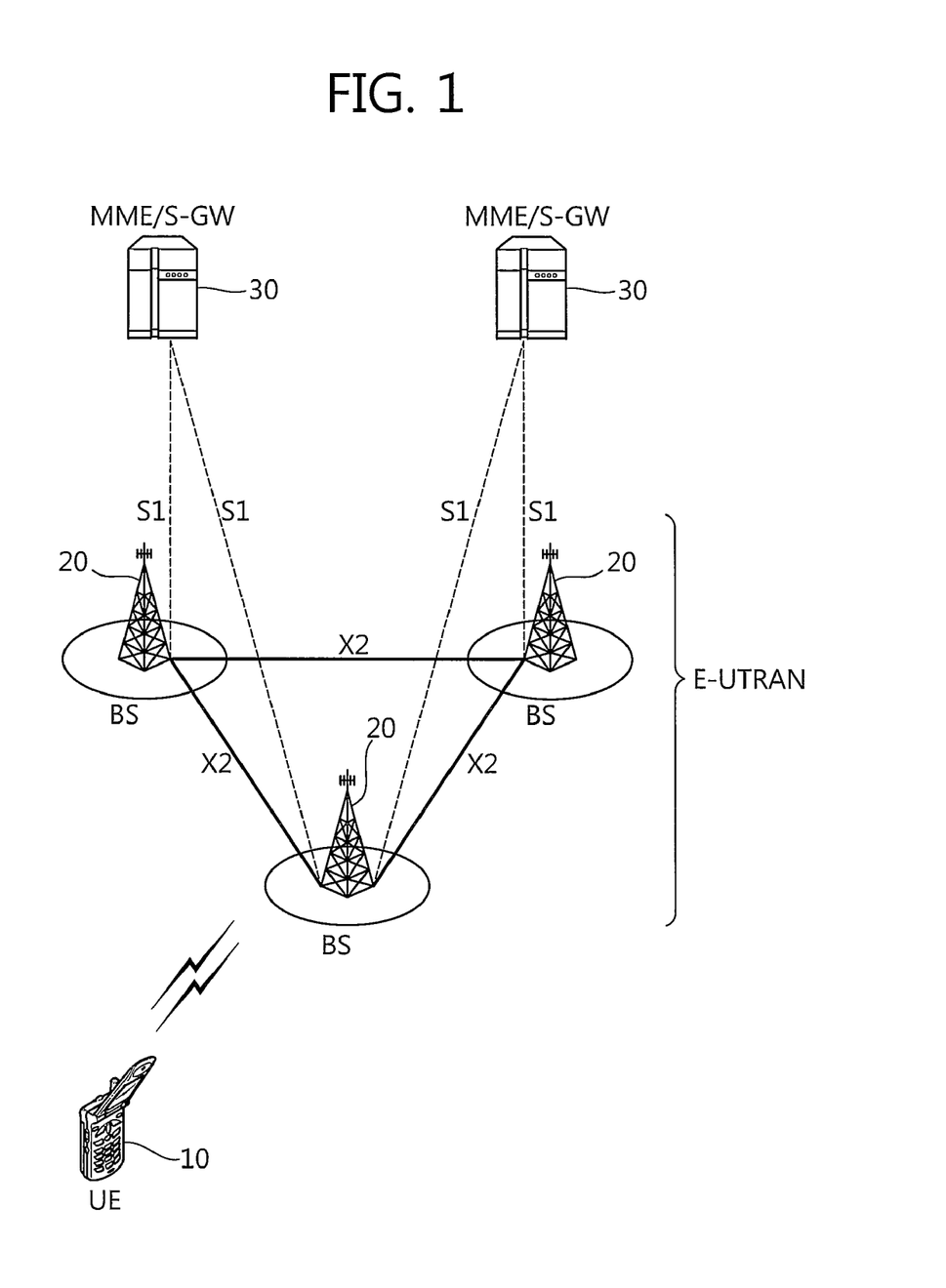
FIG. 1 illustrates a wireless communication system.

FIG. 1 illustrates a wireless communication system. The wireless communication system as shown in FIG. 1 may have a network structure of an evolved-universal mobile telecommunications system (E-UMTS). The E-UMTS system may be a long term evolution (LTE) system. The wireless communication system is widely used to provide a variety of communication services such as communication of voice, packet data, etc.

With reference to FIG. 1, an E-UTRAN (Evolved-UMTS Terrestrial Radio Access Network) includes a base station (BS) 20 providing a control plane and a user plane.

A user equipment (UE) 10 may be fixed or mobile and may be referred to by other names such as mobile station (MS), user terminal (UT), subscriber station (SS), wireless device, etc. The BS 20 generally refers to a fixed station that communicates with the UE 10 and may be called by other names such as evolved-Node B (eNB), base transceiver system (BTS), access point, etc. One or more cells may exist in the single BS 20. An interface for transmission of user traffic or control traffic may be used between BSs 20. In the following description, downlink may refer to communication from the BS 20 to the UE 10, and uplink may refer to communication from the UE 10 to the BS 20.

The BSs 20 may be connected via an X2 interface. The BSs are connected to evolved packet cores (EPCs), specifically, to mobility management entities (MMEs)/serving gateways (S-GWs) 30 via an S1 interface. The S1 interface supports a many-to-many relation between the BSs 20 and the MME/S-GWs 30.

Figure 2:
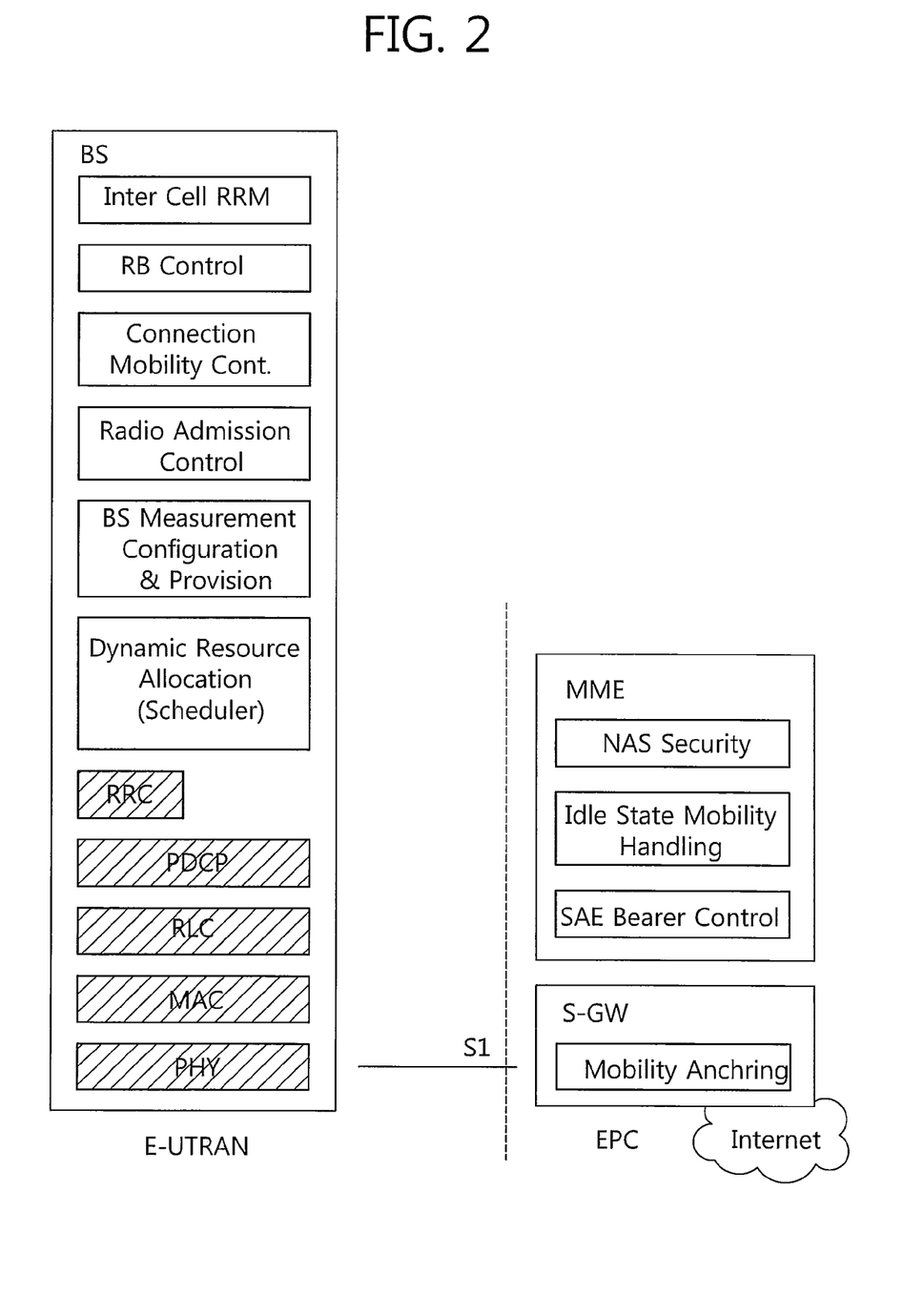
FIG. 2 illustrates a functional split between an E-UTRAN and an EPC.

FIG. 2 illustrates a functional split between the E-UTRAN and then EPC.

With reference to FIG. 2, shaded blocks (with oblique lines) indicate radio protocol layers, and empty blocks indicate functional entities of the control plane.

The BSs 20 perform the following functions: (1) Radio resource management (RRM) functions such as radio bearer control, radio admission control, connection mobility control, dynamic resource allocation to a UE; (2) Internet protocol (IP) header compression and encryption of a user data stream; (3) Routing of user plane data to the S-GW; (4) Scheduling and transmission of a paging message; (5) Scheduling and transmission of broadcast information; and (6) Measurement for mobility and scheduling and setting a measurement report.

The MMEs perform the following functions: (1) Distribution of a paging message to BSs; (2) Security control; (3) Idle state mobility control; (4) SAE bearer control; and (5) Ciphering non-access stratum (NAS) signaling and integrity protection.

S-GWs perform the following functions: (1) Termination of a user plane packet with respect to paging; and (2) User plane switching to support UE mobility.

Figure 3:
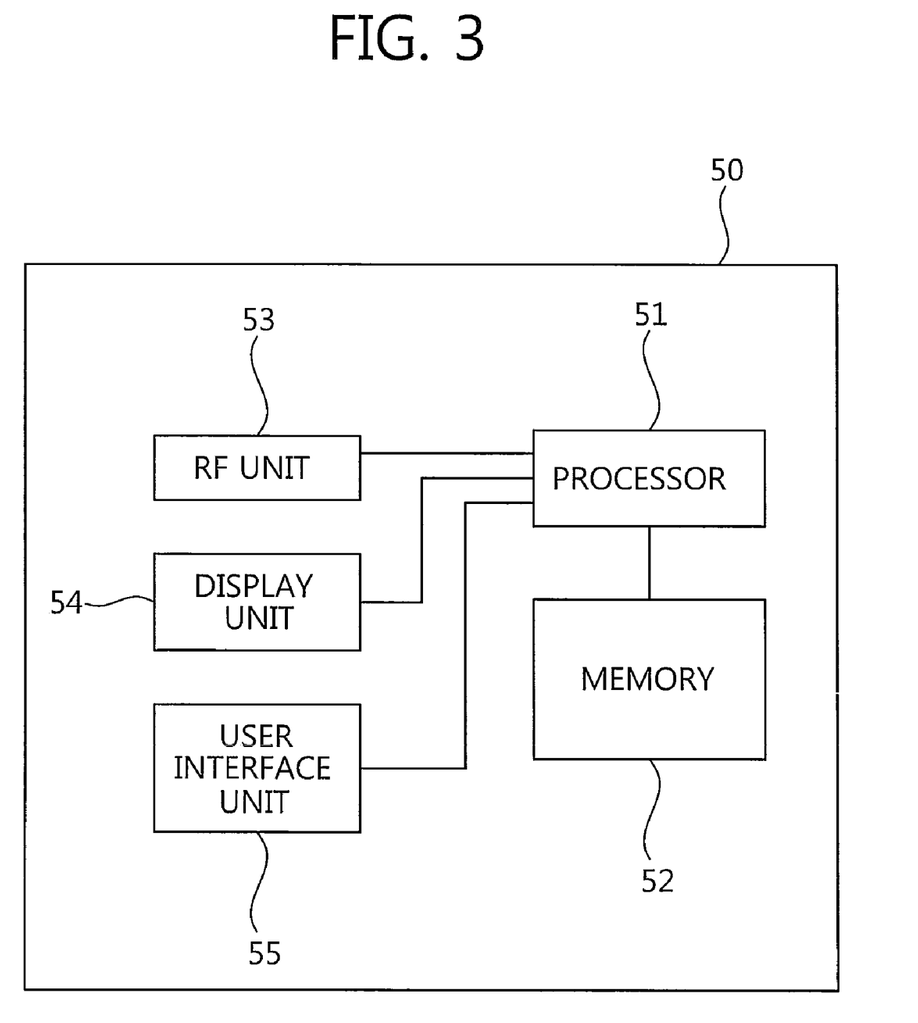
FIG. 3 is a schematic block diagram showing elements of a user equipment (UE).

FIG. 3 is a schematic block diagram showing elements of a user equipment. A UE 50 includes a processor 51, a memory 52, an RF unit 53, a display unit 54, and a user interface unit 55. The processor 51, implementing layers of a radio interface protocol, provides a control plane and a user plane. Functions of each layer may be implemented via the processor 51. The memory 52 is connected to the processor 51 and stores a UE driving system, applications and general files. The display unit 54 displays various information of the UE and may use a well known element such as a liquid crystal display (LCD), an organic light emitting diode (OLED), and the like. The user interface 55 may be a combination of well known user interfaces such as a keypad, a touch screen, and the like. The RF unit 53 is connected to the processor 51 and transmits/receives a radio signal.

The layers of the radio interface protocol between the UE and a network may be divided into a first layer (L1), a second layer (L2), and a third layer (L3) based on three lower layers of an open system interconnection (OSI) standard model widely known in communication systems. Among them, a physical layer of the first layer provides an information transfer service using a physical channel, and a radio resource control (RRC) layer positioned at the third layer serves to control radio resources between the UE and the network. To this end, the RRC layers exchange an RRC message between the UE and the network.

Figure 4:
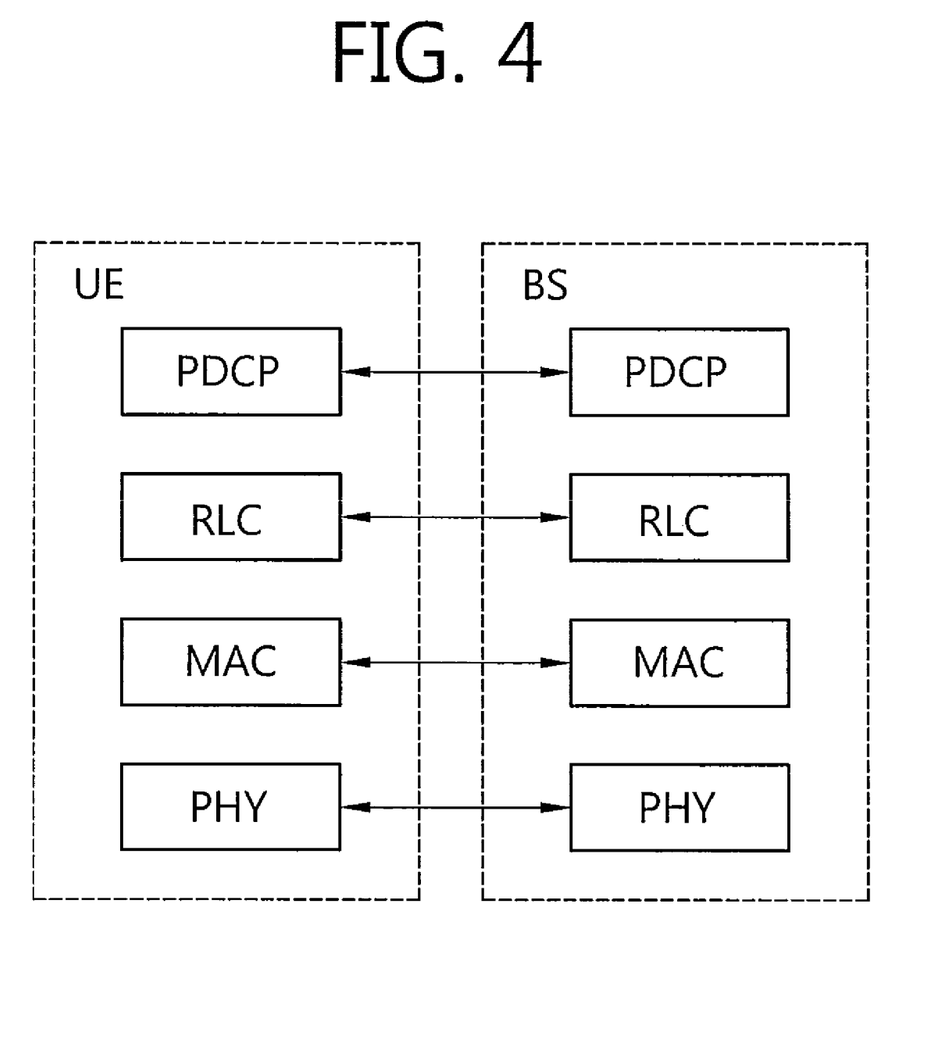
FIG. 4 illustrates a radio protocol architecture with respect to a user plane.
Figure 5:
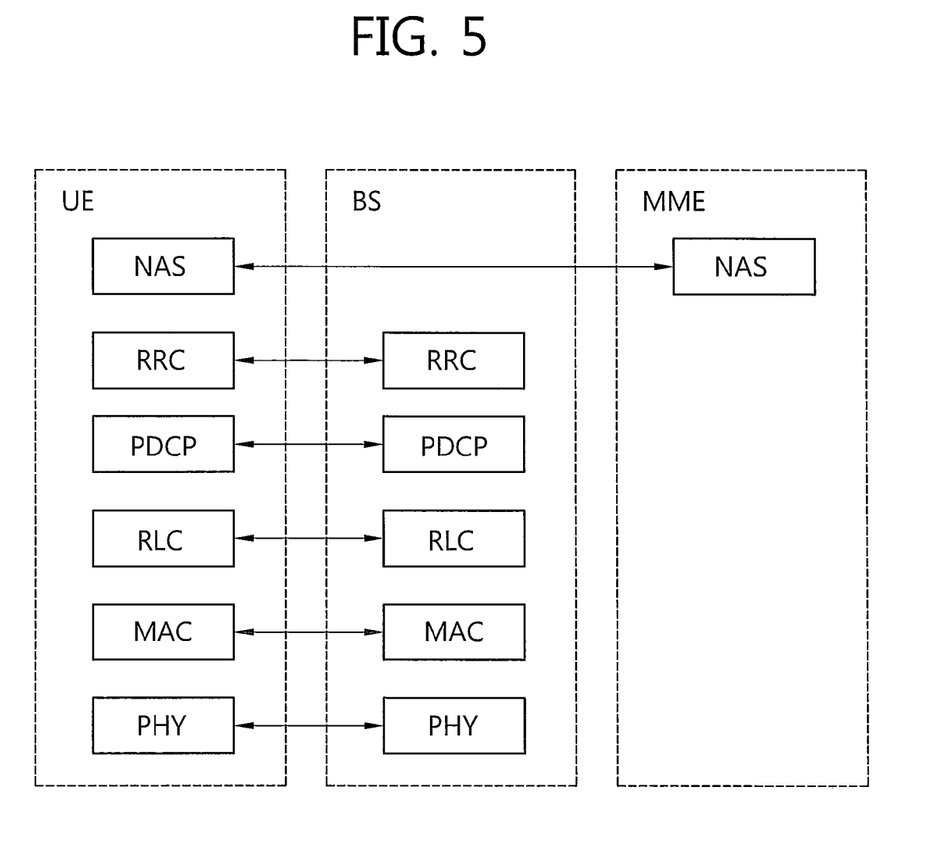
FIG. 5 illustrates a radio protocol architecture with respect to a control plane.

FIG. 4 illustrates a radio protocol architecture with respect to the user plane. FIG. 5 illustrates a radio protocol architecture with respect to the control plane, namely, a radio interface protocol architecture between the UE and the E-UTRAN. The data plane is a protocol stack for transmission of user data, and the control plane is a protocol stack for transmission of a control signal.

With reference to FIGS. 4 and 5, the physical layer (PHY), the first layer, provides an information transfer service to an upper layer by using a physical channel. The physical layer is connected to an upper medium access control (MAC) layer via a transport channel, and data is transferred between the MAC layer and the physical layer via the transport channel. Meanwhile, between different physical layers, namely, between a physical layer of a transmitting side and that of a receiving side, data is transferred via a physical channel. The physical layer may be modulated according to an orthogonal frequency division multiplexing (OFDM) scheme and utilize time and frequency as radio resources.

The MAC layer of the second layer provides a service to a radio link control (RLC) layer, its upper layer, via a logical channel. The RLC layer of the second layer may support reliable data transmissions. The RLC layer includes three operations modes, namely, a transparent mode (TM), an unacknowledged mode (UM), and an acknowledged mode (AM), according to a data transmission method. The AM RLC provides a bi-directional data transmission service and supports retransmission in the occurrence of a transmission failure of an RLC protocol data unit (PDU).

A PDCP layer of the second layer performs a header compression function to reduce the size of a header of an IP packet including relatively sizable unnecessary control information, in order to effectively transmit the IP packet such as IPv4 or IPv6 in a radio interface with a relatively small bandwidth.

A radio resource control (RRC) layer of the third layer is defined only in the control plane. The RRC layer handles the controlling of logical channels, transport channels, and physical channels in relation to configuration, reconfiguration, and release of radio bearers (RBs). The RB refers to a service provided by the second layer (L2) for data transmission between the UE and the E-UTRAN. If there is an RRC connection between the RRC of the UE and that of the network, the UE is in an RRC connected mode, and otherwise, the UE is in an RRC idle mode.

A non-access stratum (NAS) layer existing at an upper position of the RRC layer serves to perform a function of session management, mobility management, and the like.

Downlink transport channels for transmitting data from the network to the UE include a broadcast channel (BCH) for transmitting system information, a downlink-shared channel (DL-SCH) for transmitting user traffic or a control message, and the like. Traffic or a control message of a downlink broadcast service may be transmitted via the DL-SCH. Uplink transport channels for transmitting data from the UE to the network include a random access channel (RACH) for transmitting an initial control message and an uplink-shared channel (UL-SCH) for transmitting user traffic or a control message.

Downlink physical channels mapped to the downlink transport channel include a physical broadcast channel for transmitting information of the BCH, a physical downlink shared channel (PDSCH) for transmitting information of the PCH and the DL-SCH, and a physical downlink control channel (PDCCH) for transmitting control information provided from the first and second layers such as a downlink or uplink radio resource allocation information (i.e., DL/UL Scheduling Grant), and the like. The PDCCH is also called a downlink L1/L2 control channel. Uplink physical channels mapped to the uplink transport channel include a physical uplink shared channel (PUSCH) for transmitting information of the UL-SCH, a physical random access channel (PRACH) for transmitting RACH information, and a physical uplink control channel (PUCCH) for transmitting control information provided by the first and second layers such as an HARQ ACK/NACK signal, a scheduling request signal, a channel quality indicator (CQI), and the like.

Time alignment will now be described. In the OFDM-based system, time alignment between the UE and the BS is important to minimize interference between users.

In order for uplink time alignment between the UE and the BS, a random access procedure is performed. Namely, the BS measures a time alignment value (timing advance) via a random access preamble transmitted by the UE, and provides the time alignment value to the UE via a random access response. Upon receipt of the random access response message, the UE applies the time alignment value and starts a time alignment timer. The time alignment timer is used to control how long the UE is considered uplink time aligned. The time alignment timer is valid only in the cell for which it was configured and started. The BS may measure the time alignment value of the UE according to other methods than the random access preamble. In this case, the BS may provide the time alignment value to the UE as necessary.

With the time alignment timer set, when the UE periodically receives a time alignment command, the UE applies the received time alignment command, then the time alignment timer starts. If the time alignment timer is running, the UE restarts the time alignment timer. If the time alignment timer expired or is not running, the UE performs a random access procedure to obtain uplink time alignment before uplink transmission. When the time alignment timer is expired, the UE shall flush all HARQ buffers, notify RRC to release PUCCH and SRS(Sounding Reference Signal) and clear any configured downlink assignments and uplink grants.

While the time alignment timer is running, time alignment is maintained between the UE and the BS. If the time alignment timer has expired or is not running, time alignment between the UE and the BS is not maintained. Unless time alignment between the UE and the BS is maintained, the PUCCH resource for scheduling request (SR) and CQI is lost and the UE cannot transmit uplink data except for a random access preamble. Then, the UE starts the random access procedure for time alignment.

Figure 6:
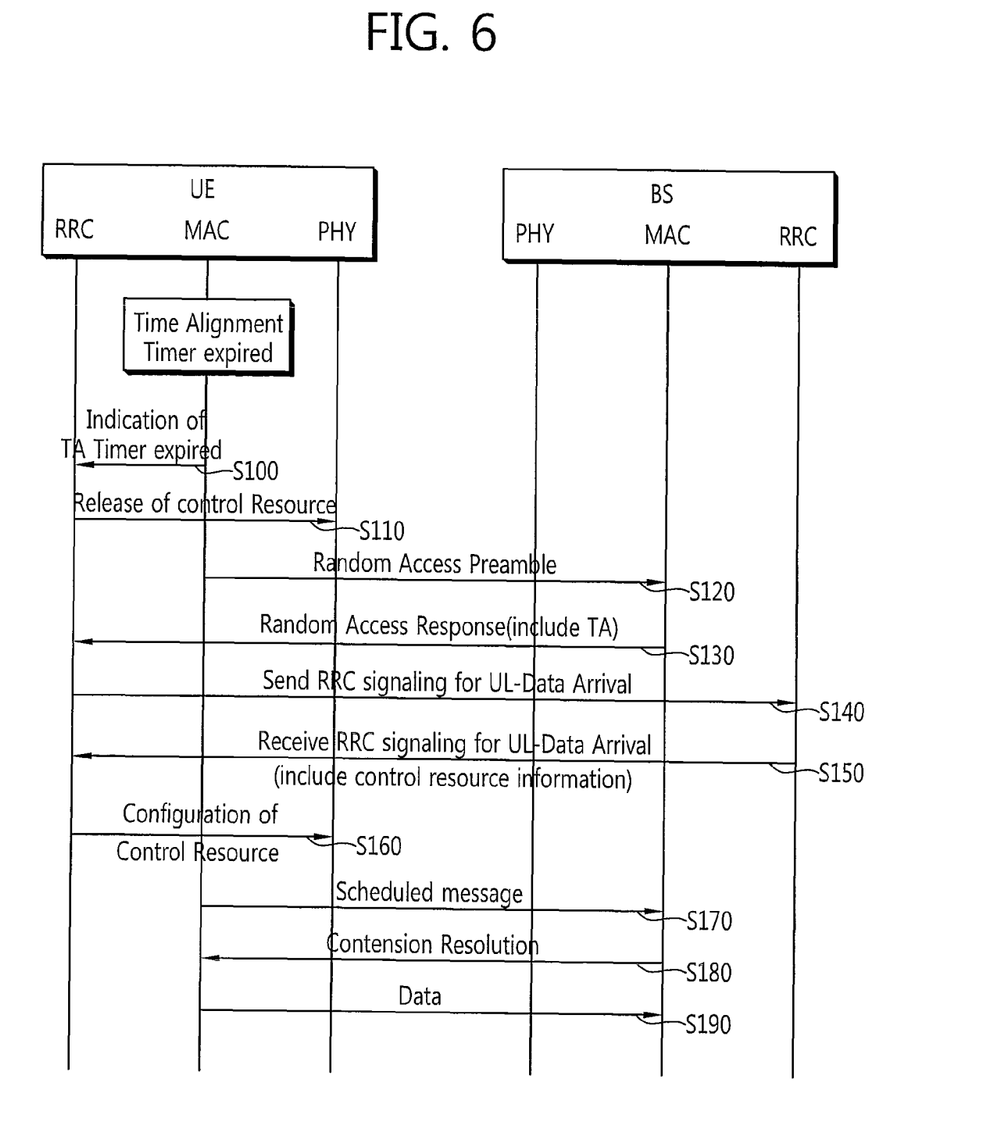
FIG. 6 illustrates an operation of a UE when a time alignment timer expires.

FIG. 6 illustrates an operation of a UE when a time alignment timer expires.

With reference to FIG. 6, when the time alignment timer expires, the MAC layer of the UE notifies the RRC layer of the UE of an expiry of the time alignment timer (S100). And then, a control resource release command is transmitted from the RRC layer of the UE to the PHY layer of the UE (S110). The control resource includes PUCCH, SRS, and the like. In addition, the RRC layer of the UE requests the MAC layer to start the random access procedure.

The UE transmits a random access preamble to the BS (S120). The random access preamble is transmitted from the MAC layer of the UE to the MAC layer of the BS. Upon receipt of the random access preamble, the BS transmits a random access response message to the UE (S130). The random access response message includes a time alignment value of the UE, uplink radio resource allocation information, and the like. The random access response message is transmitted from the MAC layer of the BS to the RRC layer of the UE.

Upon receipt of the random access response message, the UE transmits RRC signaling for uplink transmission from the RRC layer of the UE to the RRC layer of the BS (S140). The RRC signaling is transmitted by using the uplink radio resource allocation information included in the random access response message. Upon receipt of the RRC signaling, the BS transmits RRC signaling for uplink transmission from its RRC layer to the RRC layer of the UE (S150). In this case, the BS adds control resource information in the RRC signaling and transmits the same. Upon receipt of the control resource information, the UE configures control resource from the RRC layer of the UE to the PHY layer of the UE (S160).

The UE transmits a scheduling request message to the BS (S170). Upon receipt of the scheduling request message, the BS transmits uplink radio resource allocation information to the UE via the PDCCH (S180). The UE transmits a message including a UE identifier to the BS via allocated uplink radio resource (S190). Steps S180 to S200 are performed between the MAC layer of the UE an the MAC layer of the BS.

In this manner, when the UE has data to be transmitted to uplink, if the time alignment timer has expired or is not running, the UE obtains time alignment through the random access procedure. However, with reference to FIG. 6, when the time alignment timer has expired, the UE releases the control resource such as PUCCH resource and SRS resource, and receives the newly set control resource from the BS. Here, additional time is required in the process of releasing and reconfiguring the control resource, causing a delay in the uplink data transmission. Thus, a method for quick and effective uplink transmission in case where the time alignment timer expires or is not running is required.

Figure 7:
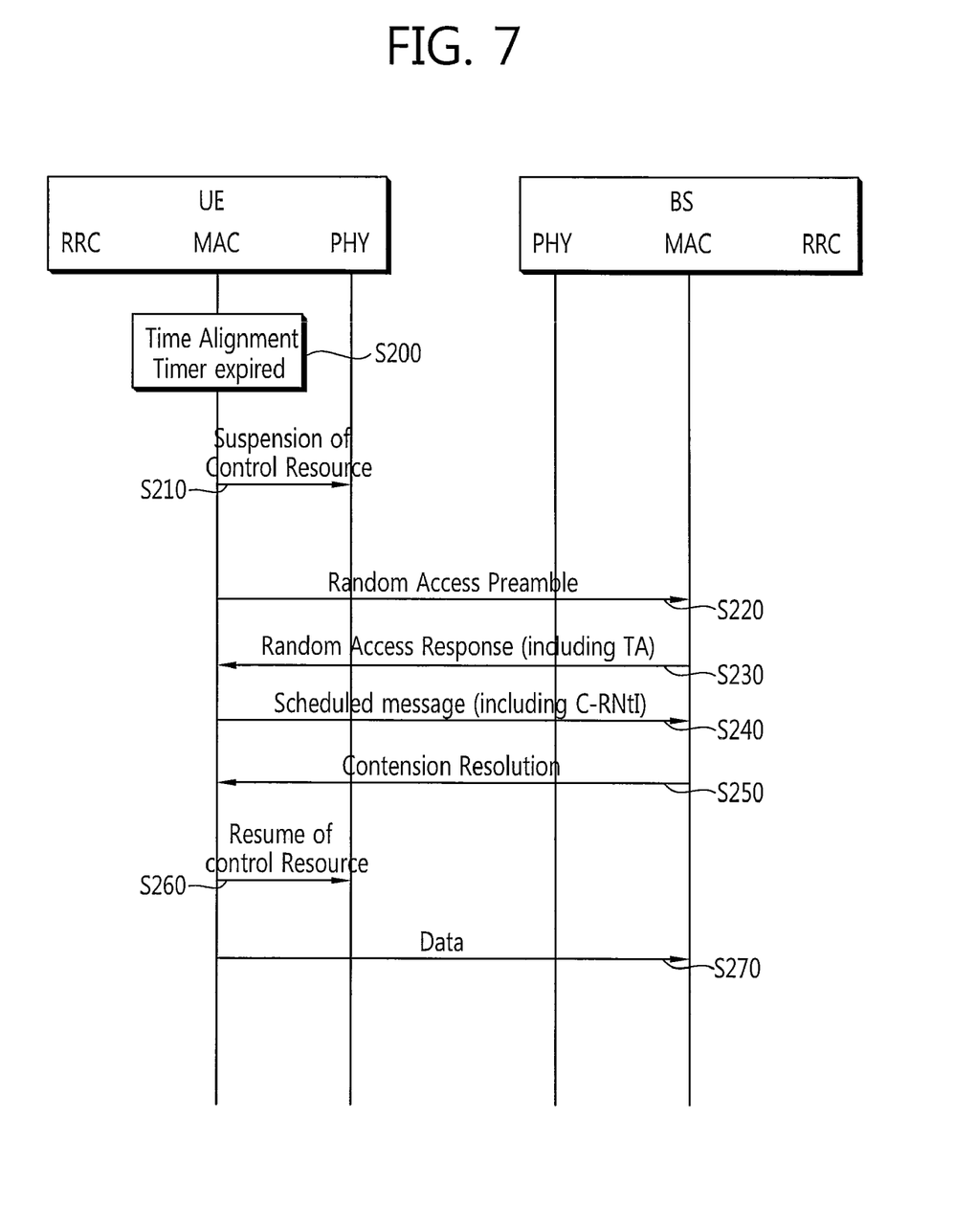
FIG. 7 illustrates an operation of a UE when a time alignment timer expires according to an embodiment of the present invention.

FIG. 7 illustrates an operation of the UE when the time alignment timer expires according to an embodiment of the present invention.

With reference to FIG. 7, the time alignment timer of the UE expires (S200). In general, the time alignment timer restarts when a downlink time alignment MAC control element transmitted from the BS to the UE is received. However, if the time alignment MAC control element is not received until the time alignment timer expires, the time alignment timer expires.

When the time alignment timer expires, the MAC layer of the UE notify the PHY layer to suspend(keep) control resources (S210). The UE notifies RRC of expiry of the time alignment timer and release of the control resource, and transfer keeping the control resource from the RRC layer to PHY layer. The control resources refer to PUCCH resources, SRS resources, and the like. The PUCCH resource may be one for transmitting an ACK/NACK signal. If the uplink time alignment is not obtained, uplink transmission except for the random access preamble, is not made, so the control resource is kept.

After the control resource is kept, the UE transmits the random access preamble to the BS (S220). This is to obtain uplink time alignment, which corresponds to a contention-based random access procedure. In general, the UE transmits the random access preamble via a selected PRACH resource by using system information received from the BS. The system information includes information regarding an available set of random access preambles, and the UE transmits the random access preamble arbitrarily selected from the set of random access preambles.

Upon receipt of the random access preamble, the BS transmits a random access response message to the UE (S230). The random access response message includes a time alignment value (timing advance) for uplink alignment, uplink radio resource allocation information (uplink grant), a random access preamble identifier corresponding to the transmitted random access preamble, and a temporary cell-radio network temporary identity (C-RNTI). Upon receipt of the time alignment value, the UE may restart the time alignment timer by applying the time alignment value.

Upon receipt of the random access response message, the UE transmits a scheduled message including a UE unique identifier by using the uplink radio resource allocation information to the BS (S240). The UE unique identifier may be the C-RNTI or an upper layer identifier. Because the unique identifier is used for a contention resolution, it is also called a contention resolution identifier.

Upon receipt of the message including the UE unique identifier, the BS transmits a contention resolution message including the uplink radio resource allocation information to the UE (S250). In this case, if the uplink radio resource allocation information is the same as the uplink radio resource allocation information designated by the UE unique identifier which has been transmitted by the UE, the BS determines that the contention has been resolved. Additionally, when a connection release timer expires, the BS releases its connection with the UE. A minimum period of the connection release timer is the sum of the period of the time alignment timer of the UE and time take for performing the random access procedure n number of times.

Steps S220 and S250 are performed between the MAC layer of the UE and that of the BS. Thus, unlike the related art in which the RRC signaling is performed, uplink alignment can be simply and quickly made.

After step S250, the control resource which has been kept at the PHY layer of the UE is resumed (S260). The UE receives the time alignment value through the random access procedure, performs uplink alignment, and transmits data to uplink by resuming the control resource which has been kept (S270). The UE transmits the uplink data via the UL-SCH.

With reference to FIG. 7, if the time alignment timer expires or is not running, the control resource is kept and then the random access procedure for uplink alignment is attempted. Thus, additional time is not required in the process of releasing and reconfiguring the control resource, there is no time delay, and thus, the uplink transmission can be quickly performed.

Figure 8:
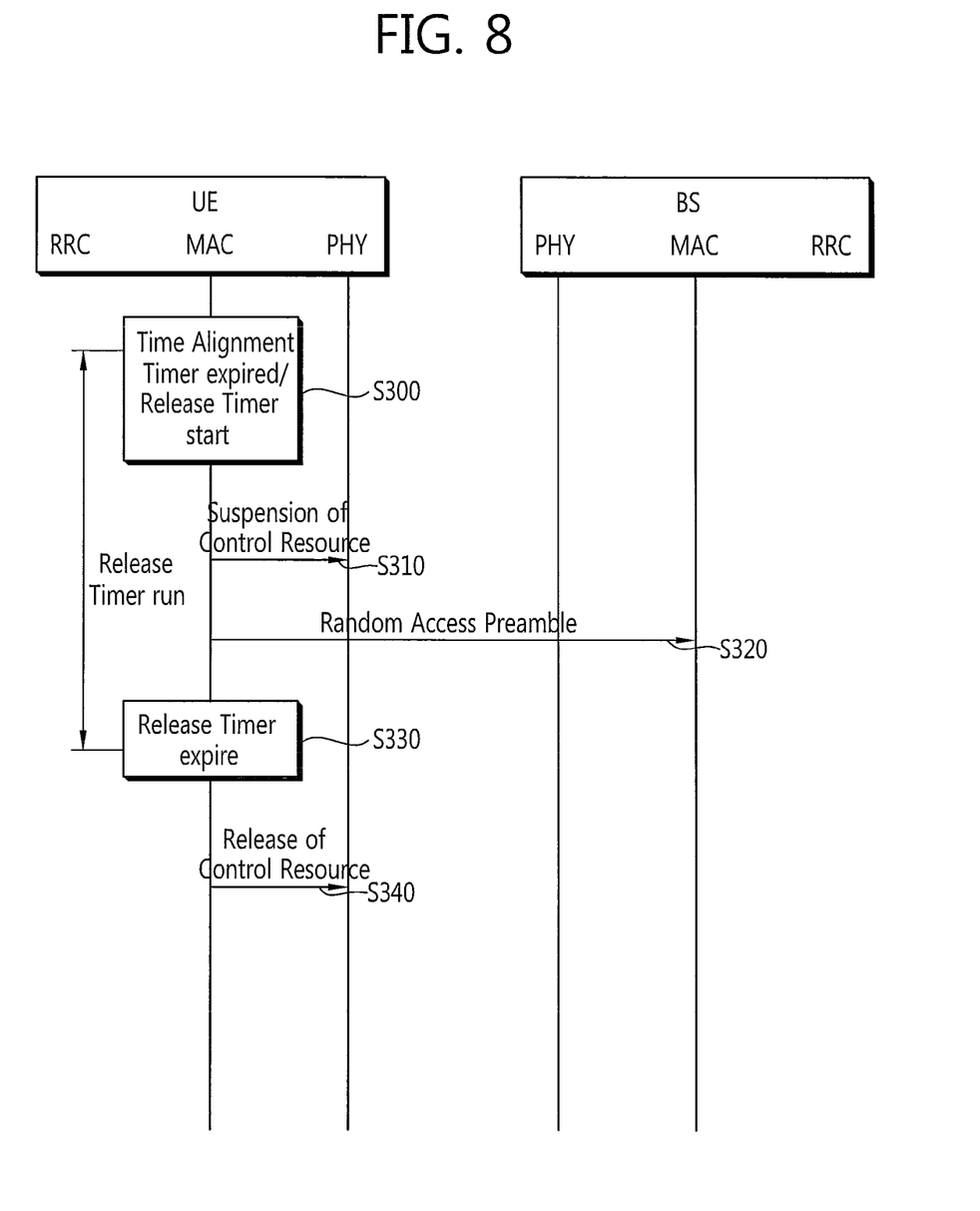
FIG. 8 illustrates an operation of a UE when uplink time alignment is not made within a certain time after the time alignment timer expires.

FIG. 8 illustrates an operation of the UE when uplink time alignment is not made within a certain time after the time alignment timer expires.

With reference to FIG. 8, when the time alignment timer expires, the UE starts a release timer (S300). The period of the release timer may be set as time generally taken for performing the random access procedure n times. In addition, the period of the release timer is shorter than that of the connection release timer of the BS.

Next, the MAC layer of the UE notifies the PHY layer to suspend(keep) the control resource (S310). The control resource includes PUCCH, SRS, and the like.

After the control resource is kept, the UE transmits the random access preamble to the BS (S320). This is to obtain uplink time alignment, which corresponds to a contention-based random access procedure.

Next, after the release timer expires (S330), the kept control resource is released (S340). This corresponds to a case where no response message with respect to the transmitted random access preamble is received until when the release timer expires or a case where the random access procedure fails. When the release timer expires and the kept control resource is released, the BS may release its connection with the UE.

With reference to FIG. 8, when the time alignment is not obtained as the time alignment timer expires, the random access procedure is attempted to obtain the uplink alignment. If the random access procedure is not successful within a certain time, the kept resource in the UE may be released and the BS may release its connection with the UE.

The present invention may be implemented by hardware, software, or their combination. In implementing hardware, hardware may be implemented by ASIC (application specific integrated circuit), DSP (digital signal processing), PLD (programmable logic device), FPGA (field programmable gate array), processor, controller, microprocessor, other electronic unit which have been designed to perform the above-described functions, or their combination. In implementing software, software may be implemented by a module that performs the above-described functions. The software may be stored in the memory unit and executed by the processor. As the memory unit or the processor, various units well known to the person in the art can be employed.

The preferred embodiments of the present invention have been described with reference to the accompanying drawings, and it will be apparent to those skilled in the art that various modifications and variations can be made in the present invention without departing from the scope of the invention. Thus, it is intended that any future modifications of the embodiments of the present invention will come within the scope of the appended claims and their equivalents.

What is claimed is:

1. A method for uplink transmission in a wireless communication system, the method carried out by a user equipment (UE), the method comprising:
receiving a time alignment command from a base station;
starting a time alignment timer by applying the time alignment command so as to control how long the UE is considered uplink time aligned;
detecting whether the time alignment timer has expired;
when the time alignment timer has expired,
notifying a release of control resources used for transmission of control signals from a Medium Access Control (MAC) layer to a Radio Resource Control (RRC) layer, and
notifying a physical (PHY) layer by the MAC layer to suspend the control resources while the time alignment timer is not running;
upon a receipt of the release notification at the RRC layer, performing a random access procedure; and
resuming the control resources suspended in the PHY layer when the timer alignment timer is restarted.

2. The method of claim 1, further comprising: applying default control configurations in the RRC layer.

3. The method of claim 1, wherein the control signals include a channel quality indicator (CQI), a sounding reference signal and a scheduling request.

4. The method of claim 1, further comprising:
when the time alignment timer has expired, releasing any downlink assignments and uplink assignments.

5. The method of claim 1, wherein the random access procedure comprises:
after the time alignment timer is expired, transmitting to the base station a random access preamble that is randomly selected from a set of random access preambles;
receiving a random access response as a response to the random access preamble, the random access response including a new time alignment command; and
restarting the time alignment timer by applying the new time alignment command.

6. The method of claim 5, wherein the random access procedure comprises:
stopping the restarted time alignment timer when contention resolution is considered not successful.

7. A user equipment (UE), comprising:
a radio frequency (RF) unit configured to receive and transmit radio signals; and
a processor operatively connected to the RF unit, and configured to implement a radio interface protocol including a Medium Access Control (MAC) layer and a Radio Resource Control (RRC) layer,
wherein the processor is further configured to:
receive a time alignment command from a base station;
start a time alignment timer by applying the time alignment command so as to control how long the UE is considered uplink time aligned;
detect whether the time alignment timer has expired;
when the time alignment timer has expired,
notify a release of control resources used for transmission of control signals from the MAC layer to the RRC layer, and
notify a physical (PHY) lager by the MAC layer to suspend the control resources while the time alignment timer is not running;
upon a receipt of the release notification, perform a random access procedure; and
resume the control resources suspended in the PHY layer when the timer alignment timer is restarted.

8. The UE of claim 7, wherein the processor is configured to apply default control configurations in the RRC layer.

9. The UE of claim 7, wherein the control signals include a channel quality indicator (CQI), a sounding reference signal and a scheduling request.

10. The UE of claim 7, wherein the processor is configured to release any downlink assignments and uplink assignments when the time alignment timer has expired.

11. The UE of claim 7, wherein the random access procedure comprises:
after the time alignment timer is expired, transmit to the base station a random access preamble that is randomly selected from a set of random access preambles;
receive a random access response as a response to the random access preamble, the random access response including a new time alignment command; and
restart the time alignment timer by applying the new time alignment command.

12. The UE of claim 11, wherein the random access procedure comprises:
stopping the restarted time alignment timer when contention resolution is considered not successful.

13. A method for maintaining, by a user equipment (UE), an uplink time alignment in a wireless communication system, the method comprising:
receiving, from a base station, a time alignment command;
starting a time alignment timer by applying the time alignment command, the time alignment timer being used to control how long the UE is considered uplink time aligned;
detecting whether the time alignment timer is expired;
when the time alignment timer is expired, notifying a release of control resources used for transmission of control signals from a medium access control (MAC) layer to a radio resource control (RRC) layer, and notifying a physical (PHY) layer by the MAC layer to suspend the control resources while the time alignment timer is not running;
transmitting, to the base station, a random access preamble which is randomly selected from a set of random access preambles after the time alignment timer is expired;
receiving, for the base station, a random access response as a response of the random access preamble, the random access response including a timing advance command; and
restarting the time alignment timer by applying the timing advance command.

14. The method of claim 13, further comprising: stopping the restarted time alignment timer when contention resolution is considered not successful.

15. The method of claim 13, further comprising: applying default control configurations in the RRC layer on a receipt of the release notification at the RRC layer.

* * * * *